(12) United States Patent
Micanek et al.

(10) Patent No.: US 9,890,699 B2
(45) Date of Patent: *Feb. 13, 2018

(54) TURBOCHARGER TURBINE WASTEGATE MECHANISM

(71) Applicant: Honeywell International Inc., Morris Plains, NJ (US)

(72) Inventors: Vit Micanek, Brno (CZ); Petr Cizek, Brno (CZ); Stanislav Hahn, Znojmo (CZ)

(73) Assignee: Honeywell International Inc., Morris Plains, NJ (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/012,029

(22) Filed: Feb. 1, 2016

(65) Prior Publication Data

US 2016/0153352 A1   Jun. 2, 2016

Related U.S. Application Data

(63) Continuation of application No. 14/194,909, filed on Mar. 3, 2014, now Pat. No. 9,249,721.

(51) Int. Cl.
*F02B 37/18* (2006.01)
*F02B 47/08* (2006.01)
(Continued)

(52) U.S. Cl.
CPC .......... *F02B 37/186* (2013.01); *F01D 17/105* (2013.01); *F01D 17/141* (2013.01); *F01D 25/24* (2013.01); *F02B 47/08* (2013.01); *F02C 6/12* (2013.01); *F05D 2220/40* (2013.01); *F05D 2260/52* (2013.01); *F05D 2260/57* (2013.01); *Y02T 10/121* (2013.01); *Y02T 10/144* (2013.01)

(58) Field of Classification Search
CPC .......... F02B 37/186; F02B 47/08; F02C 6/12; F01D 17/105; F01D 17/141; F01D 25/24; F05D 2220/40; F05D 2260/52; F05D 2260/57; Y02T 10/121; Y02T 10/144
See application file for complete search history.

(56) References Cited

FOREIGN PATENT DOCUMENTS

DE  10 2011 007 417 A1  10/2012
DE     102011007417 A1 * 10/2012 ........... F01D 17/165

OTHER PUBLICATIONS

EP 15 155 299.9-1606, EPO Communication, dated Nov. 15, 2016 (3 pages).

(Continued)

*Primary Examiner* — Audrey K Bradley
(74) *Attorney, Agent, or Firm* — Brian J. Pangrle

(57) ABSTRACT

An assembly can include a turbine housing that includes a wastegate passage that extends to a wastegate seat; a wastegate valve that includes a control arm coupled to a wastegate shaft that extends to a wastegate plug; a control linkage operatively coupled to the control arm where the control linkage includes a control axis; an actuator operatively coupled to the control linkage for translation of the control linkage in a direction of the control axis; and a spring operatively coupled at an off-axis angle to the control axis of the control linkage where no load or a partial load is exerted to provide a clearance for centering of the wastegate plug in a closed state and where an increased load is exerted to reduce the clearance in an open state.

20 Claims, 11 Drawing Sheets

(51) Int. Cl.
*F02C 6/12* (2006.01)
*F01D 17/10* (2006.01)
*F01D 17/14* (2006.01)
*F01D 25/24* (2006.01)

(56) References Cited

OTHER PUBLICATIONS

EP 15 155 299.9-1606, EPO European Search Report, dated Jun. 30, 2015 (6 pages).

* cited by examiner

TURBOCHARGER TURBINE WASTEGATE MECHANISM

RELATED APPLICATION

This application is a continuation of a U.S. application Ser. No. 14/194,909, filed 3 Mar. 2014, issued as U.S. Pat. No. 9,249,721 on 2 Feb. 2016, both of which are incorporated by reference herein.

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
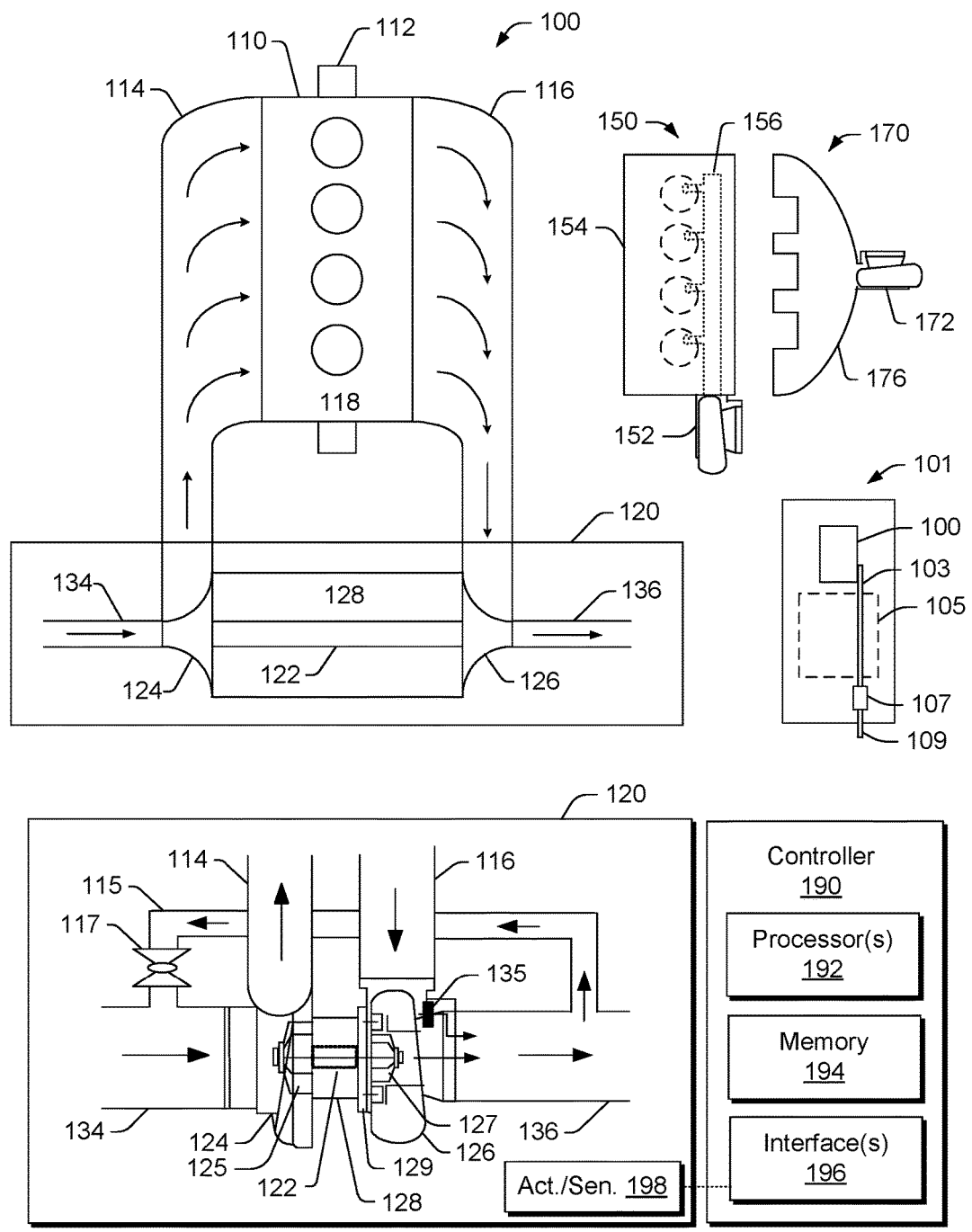
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
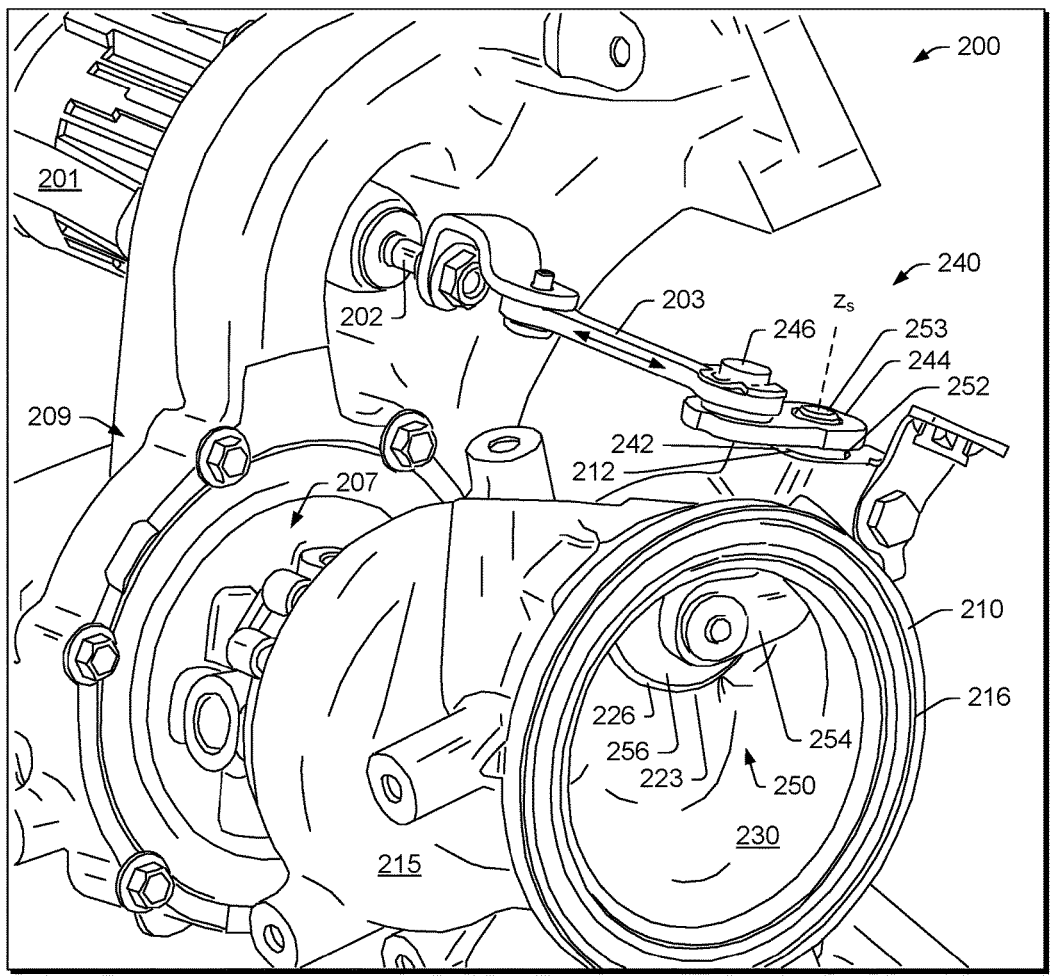
FIG. 2 is a series of view of an example of an assembly that includes a wastegate.

FIG. 2 shows an example of an assembly 200 that includes an actuator 201, an actuation rod 202, an actuator linkage 203, a center housing 207 (e.g., to house a bearing, bearings, etc. for a turbocharger shaft, etc.), a compressor housing 209, a turbine housing 210 that includes a bore 212, a spiral wall 215 (e.g., that defines, in part, a volute), an exhaust outlet opening 216, a wastegate wall 223 that extends to a wastegate seat 226, and an exhaust chamber 230.

In the example of FIG. 2, the turbine housing 210 may be a single piece or multi-piece housing. As an example, the turbine housing 210 may be a cast component (e.g., formed via sand casting or other casting process). As shown, the turbine housing 210 includes various walls, which can define features such as the bore 212, a turbine wheel opening, an exhaust outlet opening, the chamber 230, etc. In particular, the wastegate wall 223 defines a wastegate passage in fluid communication with an inlet conduit where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths.

As an example, the assembly 200 may be fitted to an exhaust conduit or other component of an internal combustion engine (see, e.g., examples of FIG. 1), for example, via a flange such that exhaust is received via an inlet conduit that may direct exhaust to a volute (e.g., or volutes) that may be defined at least in part by the spiral wall 215. As an example, a volute (e.g., or volutes) may direct exhaust (e.g., via a nozzle or nozzles) to a turbine wheel disposed in the turbine housing 210 where the exhaust may flow and expand in a turbine wheel space defined in part by the turbine housing 210. Exhaust may then exit the turbine wheel space by flowing to the chamber 230 and then out of the turbine housing 210 via the exhaust outlet opening 216.

As to wastegating, upon actuation of the control linkage 240 (e.g., by the actuator linkage 203 being operatively coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through a nozzle to a turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, the actuator 201 may include a biasing mechanism (e.g., a spring, etc.) that exerts force, which may be controllably overcome, at least in part, for rotating the plug 256 away from the wastegate seat 226 (e.g., for wastegating). As an example, the actuator 201 may be mounted to the assembly 200. As an example, the actuator 201 may be a linear actuator, for example, for moving the rod 202 along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, the rod 202 of the actuator 201 may be biased to exert a force on the control linkage 240 that causes the control linkage 240 to exert a force on the plug 256 such that the plug 256 seats against the wastegate seat 226. In such an example, the actuator 201 may at least in part overcome the force that biases the rod 202 such that the shaft 252 rotates the plug 256 away from the wastegate seat. For example, in FIG. 2, to initiate wastegating, the entire plug 256 rotates about an axis of the shaft 252 and moves away from the wastegate seat 226 (e.g., without any portion of the plug 256 moving in a direction into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (e.g., axial play, etc.), the closing force applied to the plug 256 may cause the plug 256 to move with respect to the wastegate seat 226.

In the example of FIG. 2, the axes of the bore 212, the bushing 242 and the shaft 252 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 3:
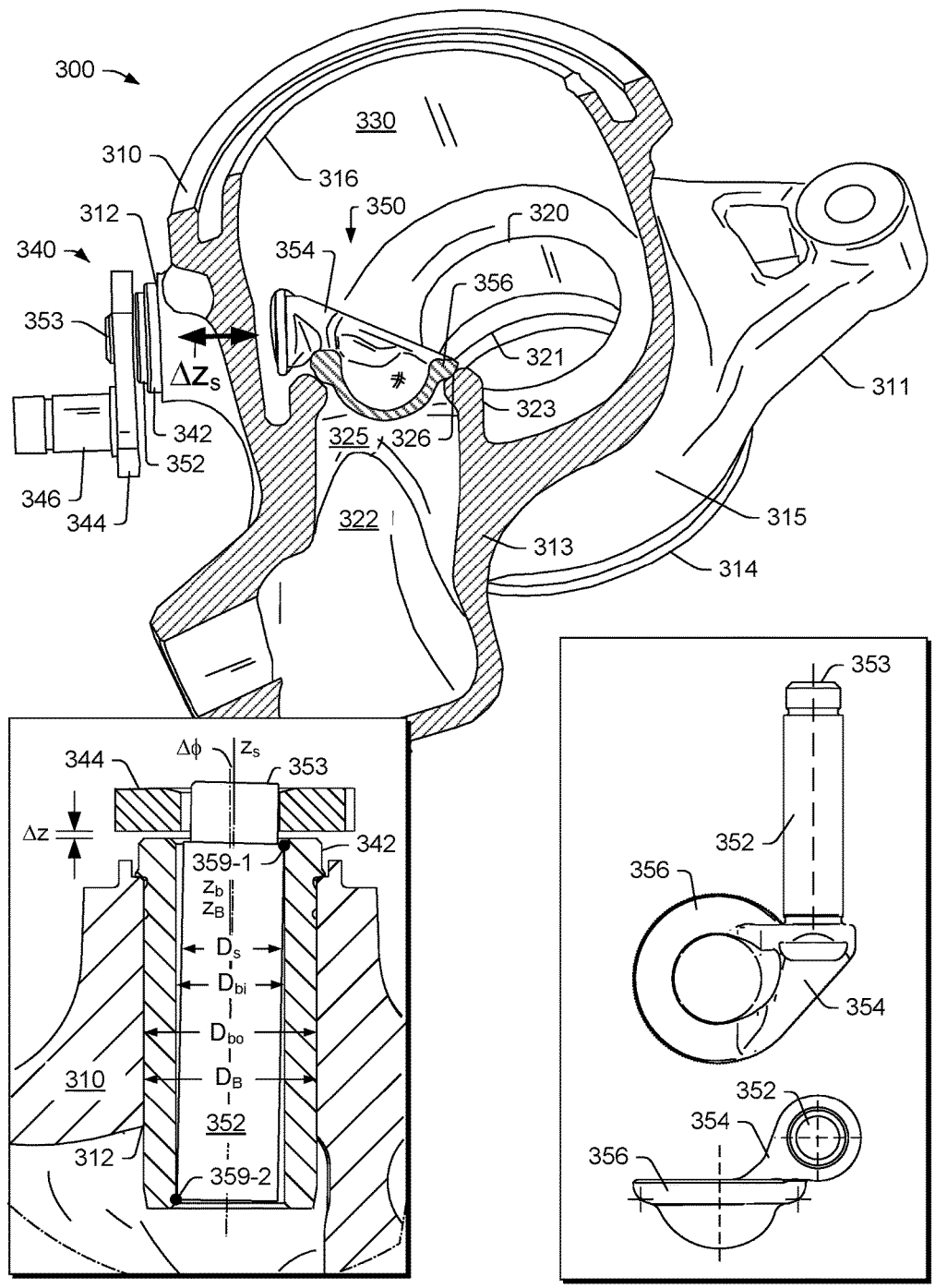
FIG. 3 is a cutaway view of an example of an assembly that includes a wastegate.

FIG. 3 shows an example of an assembly 300 that includes a wastegate arm and plug 350 that differs from the wastegate arm and plug 250 of the assembly 200 of FIG. 2. In particular, the wastegate arm and plug 350 includes a plug 356 that includes a substantially hemispherical shell portion. As an example, the wastegate arm and plug 350 may be a unitary component (e.g., optionally unitary with the shaft 352).

In the example of FIG. 3 the assembly 300 includes a turbine housing 310 that includes a mounting flange 311, a bore 312, an inlet conduit 313, a turbine wheel opening 314, a spiral wall 315, an exhaust outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust and for not wastegating exhaust).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356. As shown, the bushing 342 is disposed between the bore 312 and the shaft 352, for example, to support rotation of the shaft 352, to act to seal the chamber 330 from an exterior space, etc. The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$ and an outer diameter $D_{bo}$. In the example of FIG. 3, when the various components are assembled, as to such diameters: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$. As shown, the bushing 342 is disposed axially between a shoulder of the shaft 352 (e.g., a face of the arm 354 where the arm 354 and the shaft 352 meet) and the control arm 344 of the control linkage 340.

In the example of FIG. 3, a gap $\Delta z$ is shown between a surface of the bushing 342 and a surface of the control arm 344, which allows for axial movement of the shaft 352, for example, to facilitate self-centering of the plug 356 with respect to the wastegate seat 326. For example, the plug 356 may include shape that acts to self-center with respect to a shape of the wastegate seat 326. As an example, the plug 356 may include a toroidal portion and the wastegate seat 326 may include a conical surface such that the plug 356 may self-center with respect to the wastegate seat 326. Self-centering may be facilitated by application of force that acts to maintain the plug 356 in a closed position with respect to the wastegate seat 326.

As an example, the assembly 300 may be fitted to an exhaust conduit or other component of an internal combustion engine (see, e.g., examples of FIG. 1), for example, via a flange (see, e.g., the flange 211 of FIG. 2) such that exhaust is received via the inlet conduit 313, directed to the volute 322. From the volute 322, exhaust is directed via the nozzle 321 to a turbine wheel disposed in the turbine housing 310 via the opening 314 to flow and expand in a turbine wheel space defined in part by the shroud wall 320. Exhaust can then exit the turbine wheel space by flowing to the chamber 330 and then out of the turbine housing 310 via the exhaust outlet opening 316. As to wastegating, upon actuation of the control linkage 340 (e.g., by an actuator coupled to the peg 346), the wastegate arm and plug 350 may be rotated such that at least a portion of the received exhaust can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust may then exit the turbine housing 310 via the exhaust outlet opening 316 (e.g., and pass to an exhaust system of a vehicle, be recirculated in part, etc.).

In the example of FIG. 3, the axes of the bore 312, the bushing 342 and the shaft 352 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As mentioned, the wastegate arm and plug 350 differs from the wastegate arm and plug 250. In particular, the plug 356 differs from the plug 256. Further, the shape of the arm 354 differs from the shape of the arm 254. In an assembly such as the assembly 200 or the assembly 300, due to one or more factors, the wastegate arm and plug 350 may enhance performance, controllability, longevity, etc. when compared to the wastegate arm and plug 250.

As mentioned, as an example, the wastegate arm and plug 350 may be a unitary wastegate arm and plug (e.g., a monoblock wastegate arm and plug) or a wastegate arm and plug assembly.

As an example, the wastegate arm and plug 350 may have a lesser mass than the wastegate arm and plug 250 and, for example, a center of mass for the wastegate arm and plug 350 may differ compared to a center of mass for the wastegate arm and plug 250. As an example, due to the shape of the plug 356, it may perform aerodynamically in a more beneficial manner than the plug 256. For example, the plug 356 may, due to its shape, act to maintain its center more effectively than the plug 256. As an example, the wastegate arm and plug 350 may provide benefits as to controllability, for example, due to centering, reduced chatter, aerodynamics, etc. As an example, such benefits may improve performance, longevity, etc. of an actuator that is operatively coupled to the wastegate arm and plug 350 (e.g., for transitioning states, maintaining a state, etc.). As an example, such benefits may improve performance, longevity, etc. of a seal mechanism (e.g., bushing, bushings, etc.) for the shaft 352 of the wastegate arm and plug 350 (e.g., with respect to a bore).

As mentioned, an assembly may include a gap such as the axial gap Δz that may facilitate, for example, self-centering of a plug with respect to a wastegate seat. However, where the plug is in an open position, the gap may possibly allow for movement of the plug, for example, due to forces from exhaust flowing past the plug. Where exhaust is pulsating, such forces may possibly cause rattling and noise. For example, forces may cause a shaft to move axially with respect to a bore, a bushing, etc. (e.g., separate components), optionally in a back and forth manner (e.g., consider vibration) that may cause periodic contacting between components that may be detrimental.

Figure 4:
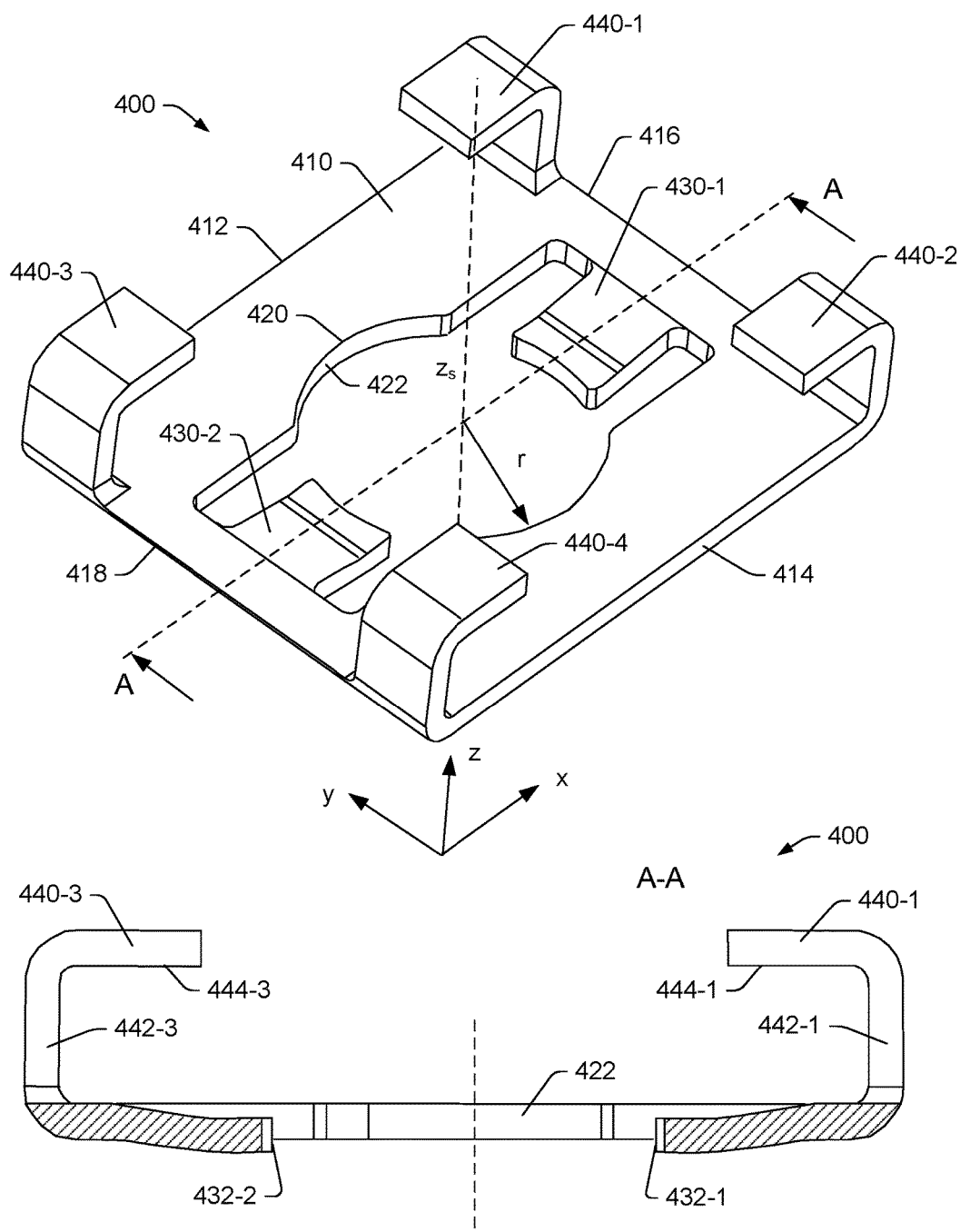
FIG. 4 is a series of views of an example of a biasing member.

FIG. 4 shows an example of a biasing cam 400 that may be operatively coupled to a portion of a control linkage for a wastegate plug. For example, the biasing cam 400 may be operatively coupled to the control arm 344 of the control linkage 340 of FIG. 3. In such an example, the biasing cam 400 may act to reduce risk of rattling and associated noise, for example, by applying a biasing force that biases the shaft 352 (e.g., axially biasing the shaft) when the plug 356 is in an open position. The biasing cam 400 may also, for example, allow for an amount of axial play when the plug 356 is in a closed position, for example, to allow for movement of the plug 356 (e.g., at least axially) with respect to the wastegate seat 326 (e.g., for self-centering, etc.).

In the example of FIG. 4, the biasing cam 400 may include a base 410 with an opening 420 defined in part by a surface 422, biasing members 430-1 and 430-2 and coupling members 440-1, 440-2, 440-3 and 440-4. As an example, the base 410 may be planar (e.g., see x and y dimensions) and include sides 412, 414, 416 and 418. As an example, the opening 420 may be defined in part by a dimension such as a radius (r) with respect to an axis ($z_s$). As an example, the base 410 may be defined in part by a thickness or thickness (e.g., see z dimension).

As an example, the biasing cam 400 may be formed from a unitary piece of material. For example, a piece of sheet metal may be stamped and formed to a shape of a biasing cam, for example, such as the biasing cam 400 shown in the example of FIG. 4. As an example, a biasing cam may be a multi-piece component that may include, for example, a base and one or more biasing components or members such as one or more springs, prongs, extensions, etc. that may be operatively coupled to the base.

In a cross-sectional view along a line A-A, the biasing members 430-1 and 430-2 are shown extending downward from the base 410 to respective ends 432-1 and 432-1, which may be disposed at approximately a radius of a radius of the opening 420. In such a configuration, the opening 420 may receive a shaft where the surface 422 of the opening 420 may contact a surface of the shaft and where the ends 432-1 and 432-2 may be moveable at least axially with respect to the surface of the shaft (e.g., for movement upward and downward to exert an appropriate biasing force). Also shown in the cross-sectional view are portions of the coupling members 440-1 and 440-3. For example, the coupling members 440-1 and 440-3 may include riser portions 442-1 and 442-3 and inwardly facing clip portions 444-1 and 444-3. In such an example, the clip portions 444-1 and 444-3 may act to operatively couple the biasing cam 400 to a control arm, etc.

As an example, a method may include operatively coupling a biasing cam to a control arm and then operatively coupling a shaft thereto (e.g., as received by an opening of the biasing cam).

As an example, as to cam functionality, locations of the biasing members 430-1 and 430-2 may determine an orientation or orientations where biasing may occur (e.g., consider angles about a central axis that define such locations). For example, if an assembly includes an orientation where the biasing members 430-1 and 430-2 do not contact or exert biasing force against another component, the biasing members 430-1 and 430-2 may be considered to be non-biasing (e.g., a non-biasing position). However, if an assembly includes an orientation where the biasing members 430-1 and 430-2 contact and exert a biasing force against another component, the biasing members 430-1 and 430-2 may be considered to be biasing (e.g., in a biasing position).

As an example, a biasing member may include a disengaged orientation and an engaged orientation. As an example, a disengaged orientation may include a clearance between a portion of a biasing cam and another component. As an example, an engaged orientation may include contact between a portion of a biasing cam and another component, for example, where a biasing force is applied via the contact. As an example, an engaged orientation may include a transitional orientation, for example, where rotation of a biasing cam results in increased biasing force, increased axial displacement of a shaft, etc.

As an example, a biasing cam may include at least one biasing member that may be in a disengaged or non-biasing position or an engaged or biasing position, for example, depending on orientation of an assembly. As an example, an orientation of an assembly may be determined by orientation of a plug with respect to a wastegate seat, for example, that may correspond to orientation of a shaft operatively coupled to the plug (e.g., degrees of rotation of the shaft with respect to a bore, etc.).

Figure 5:
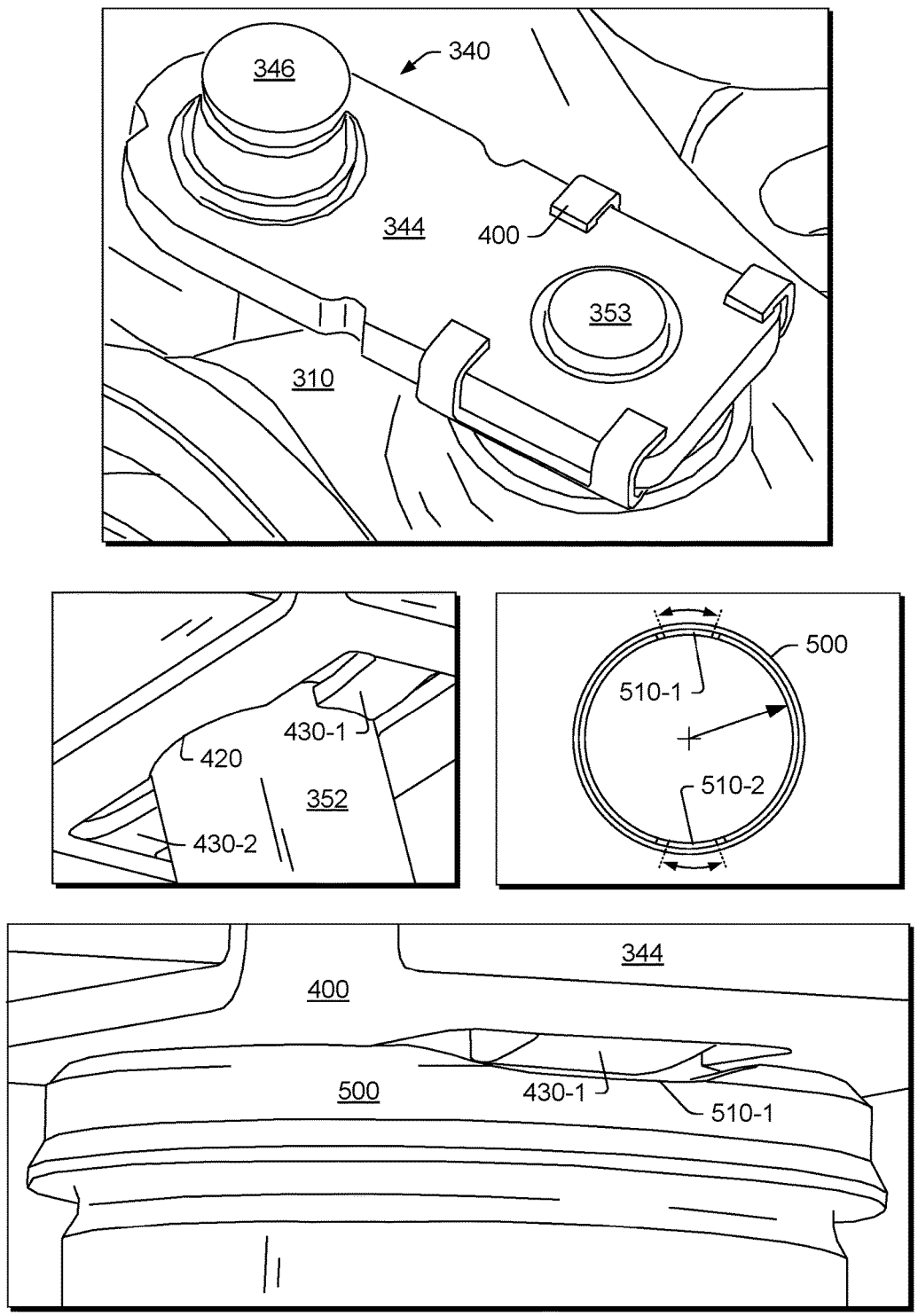
FIG. 5 is a series of views of examples of assemblies that include a biasing member.

FIG. 5 shows an example of the biasing cam 400 operatively coupled to the control arm 344 where the opening 420 receives the shaft 352. Also shown in the example of FIG. 5 is a bushing 500 that includes recesses 510-1 and 510-2 that cooperate with the biasing members 430-1 and 430-2 of the biasing cam 400. As an example, the recesses 510-1 and 510-2 may, for example, receive portions of the biasing members 430-1 and 430-2 while providing axial clearance. In such an example, the biasing members 430-1 and 430-2 may be capable of axial movement within the recesses 510-1 and 510-2 for purposes of axial movement of the shaft 352 and self-centering of a plug, operatively coupled to the shaft 352, with respect to a wastegate seat.

As an example, contact may occur between the biasing members 430-1 and 430-2 and recess surfaces of the bushing 500 that may allow for some amount of biasing force to be applied therebetween. However, such an amount of biasing force may be less than that achieved when the biasing members 430-1 and 430-2 of the biasing cam 400 are moved to not align with the recesses 510-1 and 510-2. As an example, the recesses 510-1 and 510-2 may include at least one cambered (e.g., sloping) side such that the biasing members 430-1 and 430-2 may ride the cambered side, for example, in a manner that riding higher may exert a higher biasing force (e.g., consider a Hookean biasing force where force increases with compression).

As an example, an assembly may include a biasing cam that includes at least one biasing member and a component with at least one feature that can determine whether the at least one biasing member applies a biasing force. For example, the at least one feature may be a recess of a bushing that can, in a particular orientation, receive the at least one biasing member optionally with an axial clearance and that can, in a different orientation (e.g., or orientations), not receive the at least one biasing member or receive the at least one biasing member in a manner by which a biasing force is exerted between the biasing cam and the bushing (e.g., to take up, reduce, etc. axial play).

As an example, an assembly may include a biasing cam that can provide "zero clearance" between a bushing and a control arm for one or more orientations of the control arm with respect to the bushing and that can provide for clearance between the bushing and the control arm in a manner that can allow for centering of a plug with respect to a wastegate seat (e.g., where the plug is operatively coupled to the control arm, for example, via a shaft). In such an example, the biasing cam may be a spring that exerts force at certain plug opening angles (e.g., cam functionality). In such a manner, the biasing cam may reduce risk of rattling and associated noise while still allowing for self-centering of a plug with respect to a wastegate seat. In other words, as an example, a biasing cam may act selectively as a spring that can be loaded to remove clearance between a control arm and a bushing if a plug is open but may not be loaded if the plug is closed. As an example, a biasing cam may include a linear coil spring (e.g., positioned between a control arm and a housing, etc.). As an example, a spring may be a metal spring.

As an example, a biasing cam may assist with opening of a plug with respect to a wastegate seat. For example, where an actuator exerts a downward force to maintain a plug in a closed position, the biasing cam may have a clearance such that it does not exert an opposing force. Whereas, upon opening of the plug, the actuator must overcome the downward force by applying an upward force; noting that, upon rotation of the biasing cam, it too may apply an upward force. Thus, in such an example, the biasing cam may reduce an amount of upward force to be exerted by such an actuator (e.g., once the biasing cam engages and exerts its biasing force).

Figure 6:
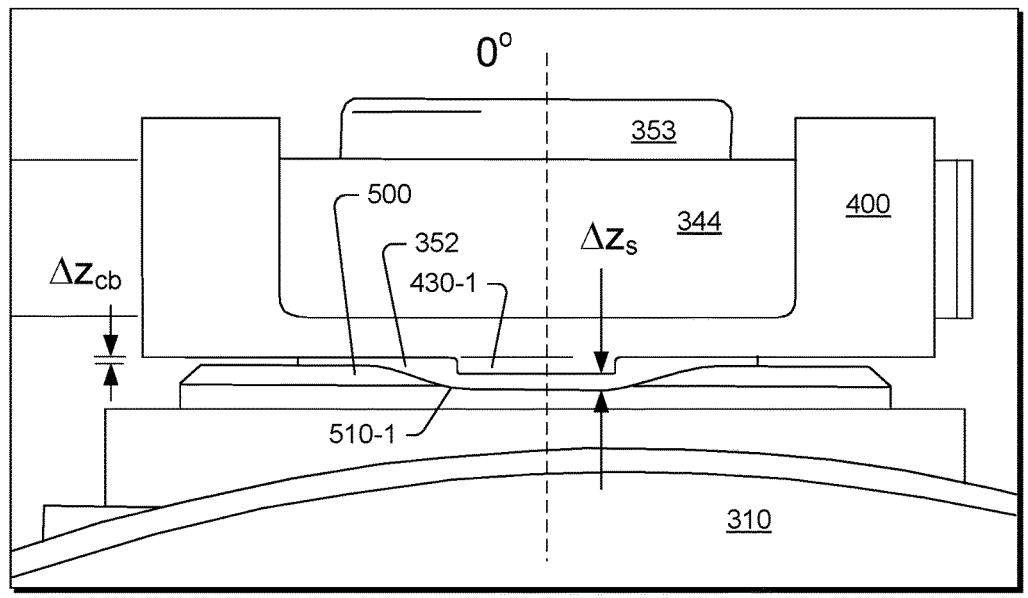
FIG. 6 is a series of views of an example of an assembly with respect to disengaged and engaged orientations of a biasing member.
Figure 6:
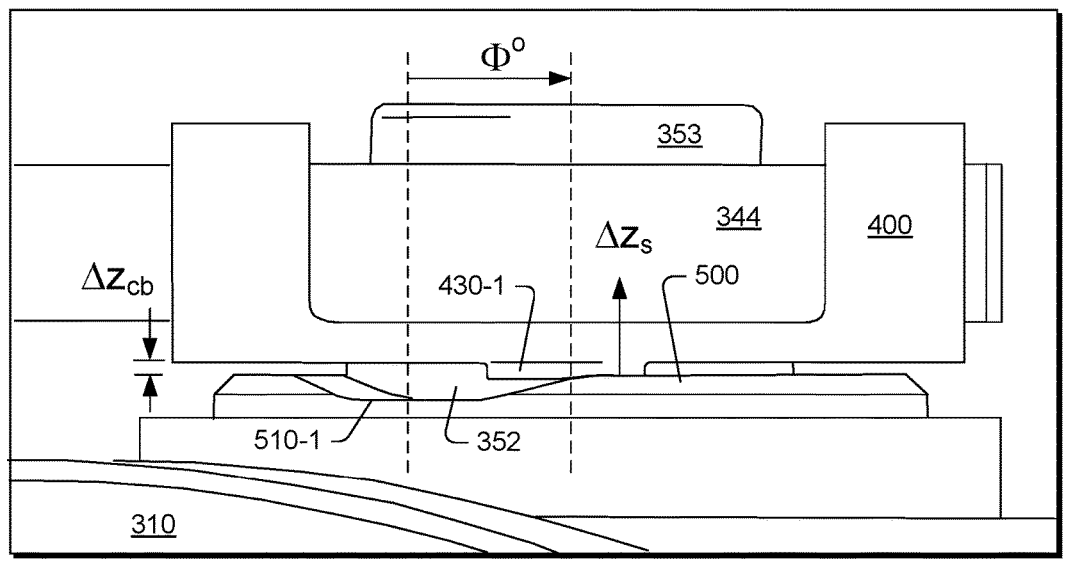

FIG. 6 shows examples of the assembly of FIG. 5 in two orientations, a so-called 0 degrees orientation (e.g., a disengaged orientation) and a $\Phi$ degrees orientation (e.g., an engaged orientation) where the biasing member 430-1 of the biasing cam 400 is engaged by a surface of the busing 500. Various dimensions are shown in FIG. 6 including, for example, a biasing cam and bushing clearance $\Delta z_{cb}$, which may be altered in a manner dependent on orientation of the control arm 344 with respect to the bushing 500. For example, a method may include orienting the biasing member 430-1 of the biasing cam 400 with respect to the recess 510-1 of the bushing 500 for altering a biasing cam to bushing axial clearance. As shown in the example of FIG. 6, altering may include moving the shaft 352 axially outwardly away from the turbine housing 310.

Figure 7:
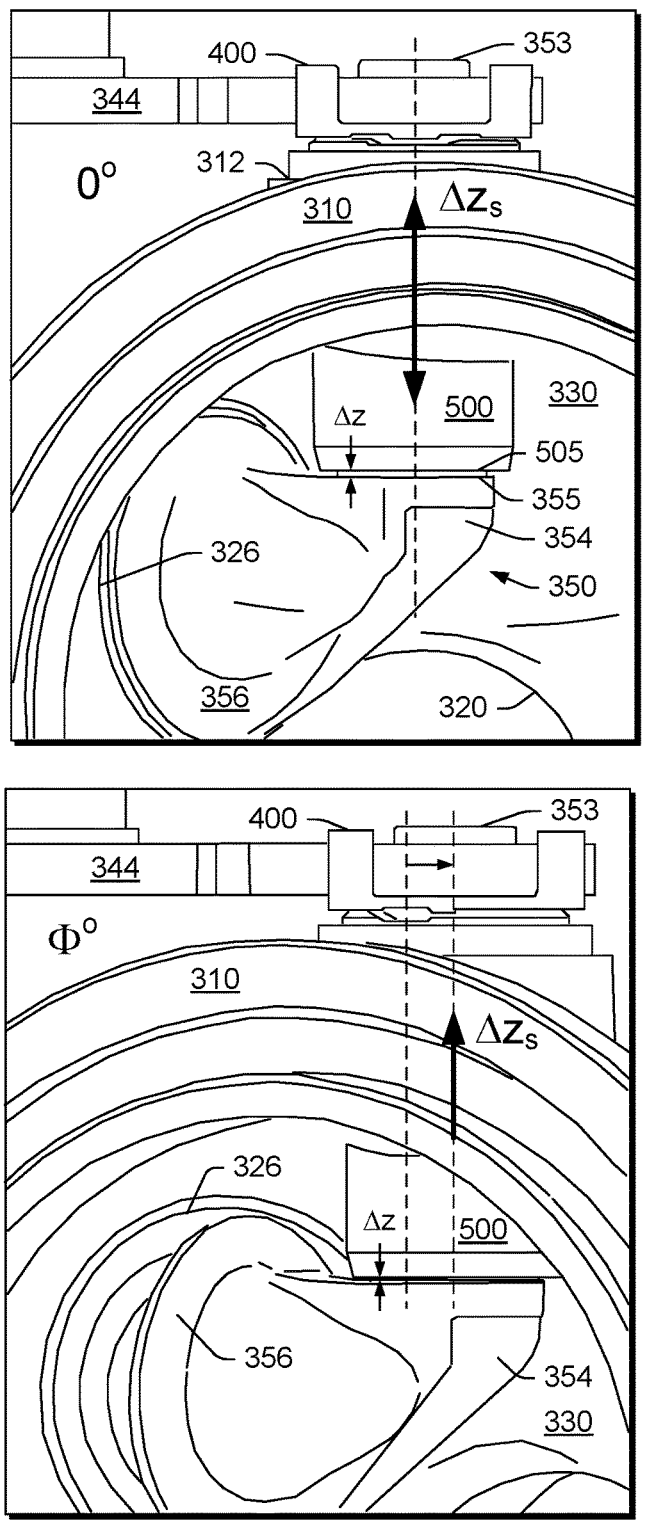
FIG. 7 is a series of views of an example of an assembly with respect to disengaged and engaged orientations of a biasing member.

FIG. 7 shows examples of the assembly of FIG. 5 in the two orientations of FIG. 6. As shown, one orientation is associated with a closed orientation (e.g., or position) of the plug 356 with respect to the wastegate seat 326 and the other orientation is associated with an open orientation (e.g., or position) of the plug 356 with respect to the wastegate seat 326 (e.g., where the shaft 352 is translated axially outwardly by a biasing force exerted by the biasing cam 400).

As shown in the examples of FIG. 7, a clearance may be reduced between a face 505 at the end of the bushing 500 and a face 355 at the end of the arm 354 when the plug 356 transitions from a closed orientation to an open orientation with respect to the wastegate seat 326. As an example, a reduction in clearance may act to impede gas flow (e.g., exhaust leakage) at an interface or interfaces, for example, as bias exerted by a biasing cam may act to pull the 355 against the face 505 of bushing 500.

As an example, during operation, a chamber space of a turbine assembly may have a pressure that exceeds an ambient pressure. In such an example, a pressure differential may act as a driving force for flow of exhaust from the chamber space to an ambient space. As such a flow of exhaust may occur prior to an exhaust treatment unit (see, e.g., the unit 107 of FIG. 1), it may be detrimental as to a goal of achieving an environmental standard or standards. As an example, wastegating may occur to avoid excessive boost to an internal combustion engine. As an example, wastegating may act to increase a pressure differential between a chamber space and an ambient space. In the example of FIG. 7, an axially outward shift of the shaft 352 responsive to action of the biasing cam 400 being rotated to a biasing position as an actuator acts to effectuate wastegating, such a shift may act to reduce a clearance or clearances that act to impede flow of exhaust from the chamber 330 to an ambient space via the bore 312. Such an approach may act to reduce rattling, vibration, etc., which, in turn, may act to reduce flow of exhaust from the chamber 330 to an ambient space via the bore 312.

Figure 8:
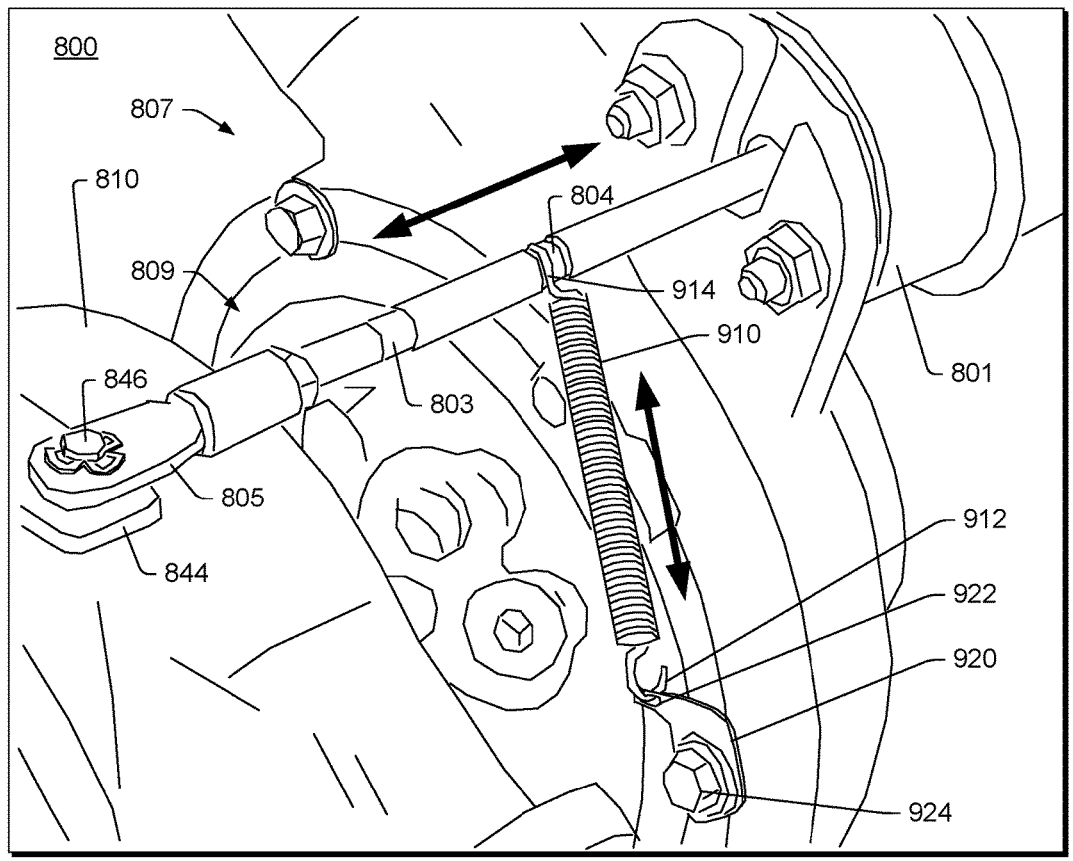
FIG. 8 is a perspective view of an example of an assembly that includes an example of a biasing mechanism.

FIG. 8 shows an example of an assembly 800 that includes an actuator 801 operatively coupled to a control rod 803 that includes a notch 804. In the example of FIG. 8, the actuator 801 is coupled to a compressor housing 807 that is coupled to a center housing 809 that is coupled to a turbine housing 810 that includes a wastegate valve controllable via a control arm 844 (e.g., via rotation of the control arm 844).

As shown in the example of FIG. 8, a peg 846 extends from the control arm 844 where the peg 846 is coupled to the control rod 803, for example, via a coupler 805 that may be adjustable (e.g., as to axial position along with respect to the control rod 803 via threads, etc.). As shown, a spring 910 may be provided as a biasing mechanism. In the example of FIG. 8, the spring 910 may be a coil spring that includes a fixed end 912 that operatively couples to the compressor housing 807 via a clamp 920 (see, e.g., an opening 922 in the clamp 920) and that includes a movable end 914 that operatively couples to the control rod 803 via the notch 804 (e.g., or other feature such as an opening, etc.).

In the example of FIG. 8, various components may be arranged such that the spring 910 exerts a biasing force on the control rod 803 in a manner that depends on position of the control rod 803 as controlled by the actuator 801. For example, the spring 910 may not exert a load (or exert a partial load) when the plug coupled to the control arm 844 is about to close (e.g., or in a closed position) and the spring 910 may exert an increased load with respect to increased stroke of the control rod 803, for example, for opening the plug (e.g., opening a wastegate for wastegating). In such an example, the direction of force exerted by the spring 910 on the control rod 803 may act to pull a shaft coupled to the control arm 844 in an outward direction, for example, to minimize a gap or clearance. As an example, the spring 910 may, in a first state, allow for axial movement of a shaft coupled to the control arm 844 where such movement may facilitate centering of a plug, coupled to (e.g., optionally integrally) to the shaft, with respect to a wastegate seat of the turbine housing 810. In such an example, the spring 910 may, in a second state, cause axial movement of the shaft outwardly, for example, to reduce a clearance (e.g., between a face of a bushing and a face of the shaft).

Figure 9:
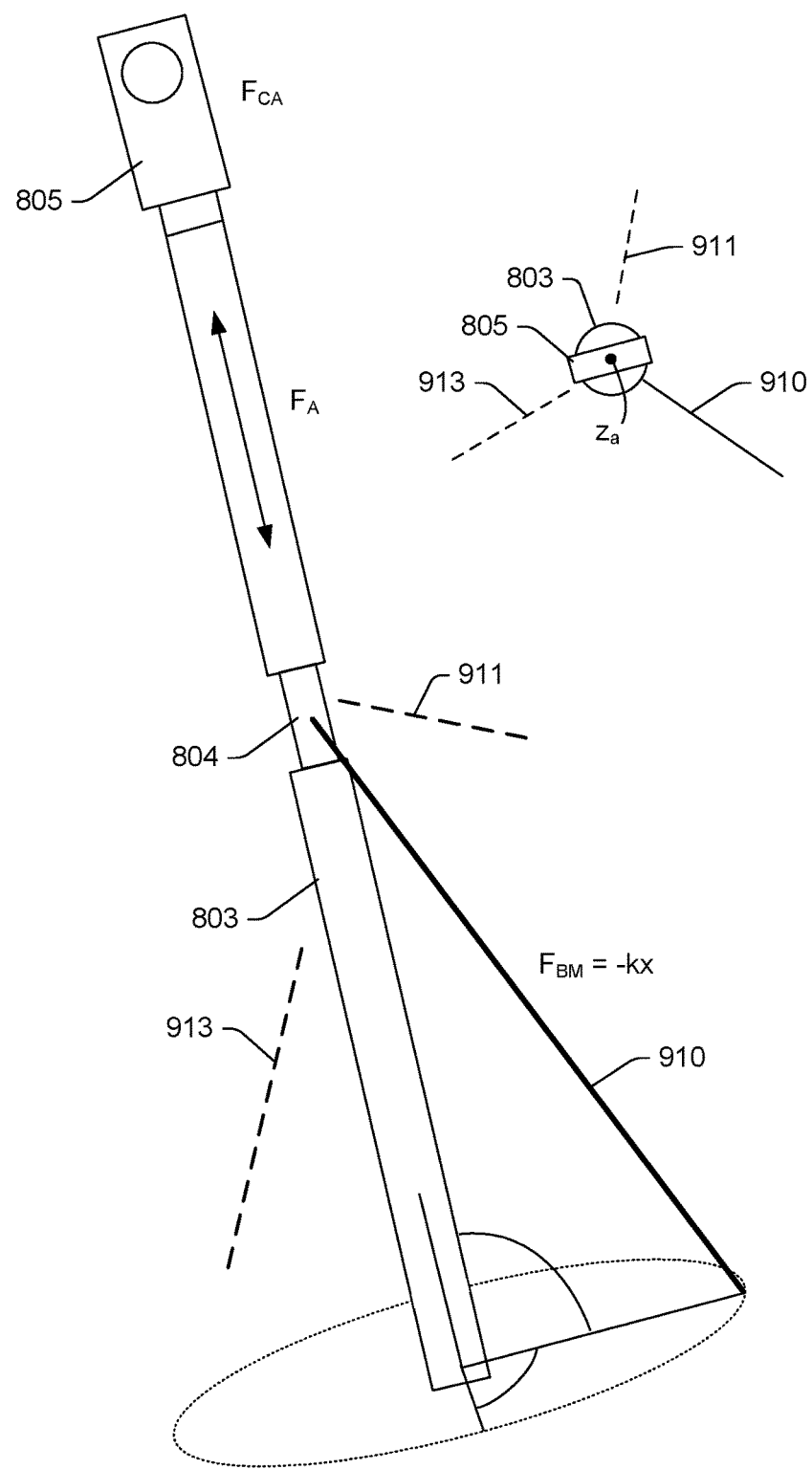
FIG. 9 is a diagram that illustrates examples of various degrees of freedom of a control rod with respect to examples of various forces.

FIG. 9 shows an example of the control rod 803 of FIG. 8 with respect to the spring 910, which is an off-axis biasing mechanism in that its axis does not align with that of the control rod 803. As an example, the spring 910 may be characterized at least in part by a spring constant k, for example, as in an equation $F_{BM}=-kx$ where x may be a length dimension or position of the spring 910. As shown in the example of FIG. 9, an actuator force $F_A$ may be applied to the control rod 803, for example, as including a component along the axis of the control rod 803 (e.g., a primary component of actuator force). Also shown in the example of FIG. 9 is a control arm force $F_{CA}$ as associated with a control arm being operatively coupled to the coupler 805.

As shown in the example of FIG. 9, one or more biasing mechanisms 910, 911 and 913 may be operatively coupled to the control rod 803 or a component operatively coupled to the control rod 803. In such an example, the one or more biasing mechanisms 910, 911 and 913 may be off-axis and change in length responsive to movement of the control rod 803. One or more off-axis biasing mechanisms (e.g., springs, etc.) may act to apply force to a control rod or a control linkage in a manner that depends on position of the control rod or the control linkage, for example, as controlled by an actuator that may control opening and/or closing of a wastegate valve (e.g., position of a wastegate plug with respect to a wastegate seat).

Figure 10:
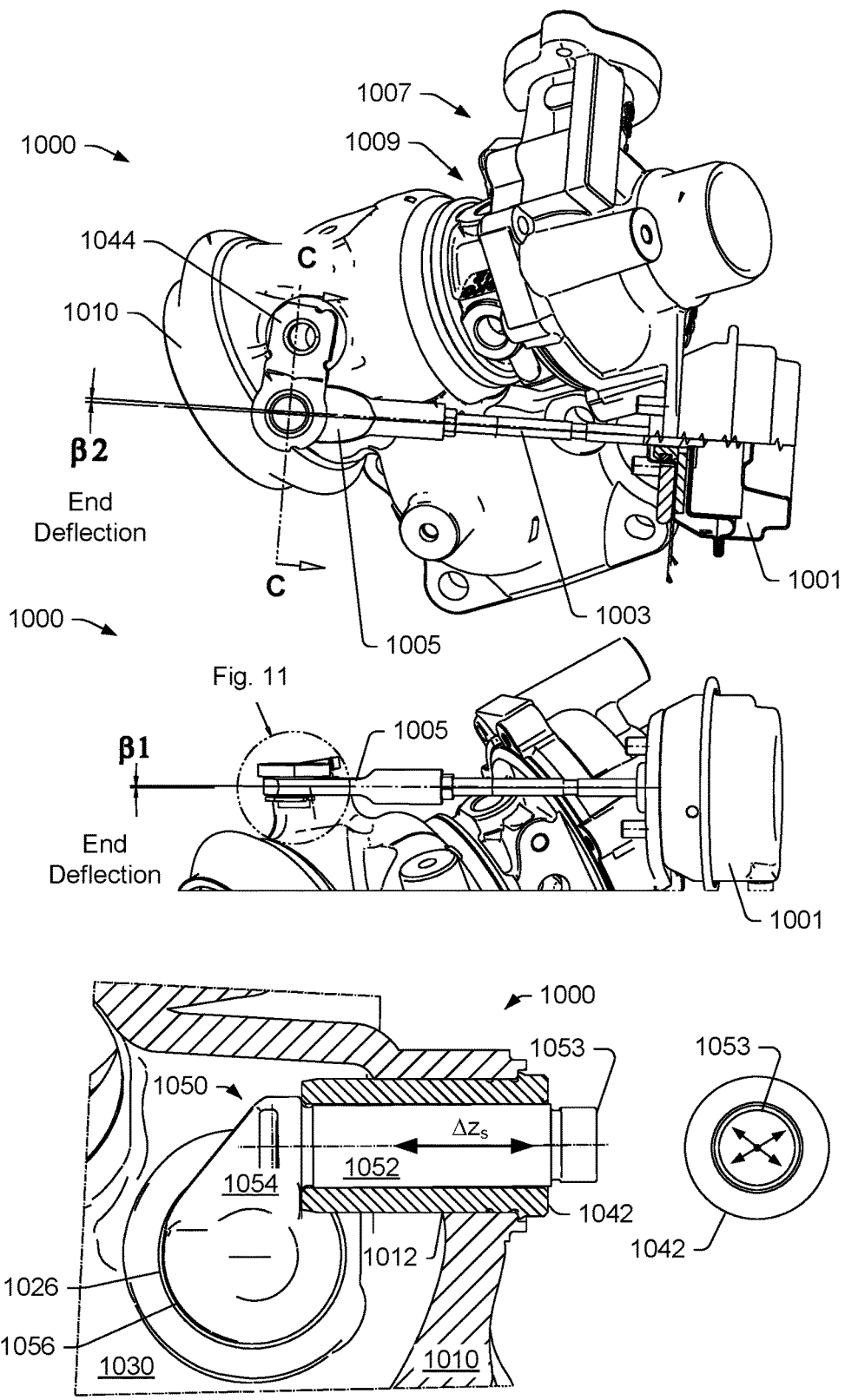
FIG. 10 is a series of views of an example of an assembly that illustrates examples of deflections.

FIG. 10 shows an example of an assembly 1000 that includes an actuator 1001 operatively coupled to a control linkage 1003. In the example of FIG. 10, the actuator 1001 is coupled to a compressor housing 1007 that is coupled to a center housing 1009 that is coupled to a turbine housing 1010 that includes a wastegate valve controllable via a control arm 1044 (e.g., via rotation of the control arm 1044).

A cutaway view shows the turbine housing 1010 as including a bore 1012, a wastegate seat 1026, a chamber 1030, a bushing 1042 and a wastegate arm and plug 1050 that includes a shaft 1052 with a shaft end 1053, an arm 1054 and a plug 1056.

As shown in FIG. 10, the control linkage 1003 may experience deflections such as end deflection in a direction β1 and end deflection in a direction β2. As indicated in the cutaway view, the shaft 1052 may experience movement along its axis as well as angular movement that, for example, off-sets the axis of the shaft 1052 from an axis of the bore 1012 and/or an axis of the bushing 1042. For example, tilting of the shaft 1052 may cause the shaft 1052 and/or the bushing 1042 to form points of contact that differ at portions of the shaft 1052 and/or the bushing 1042 with respect to the bushing 1042 and/or the bore 1012, respectively.

Figure 11:
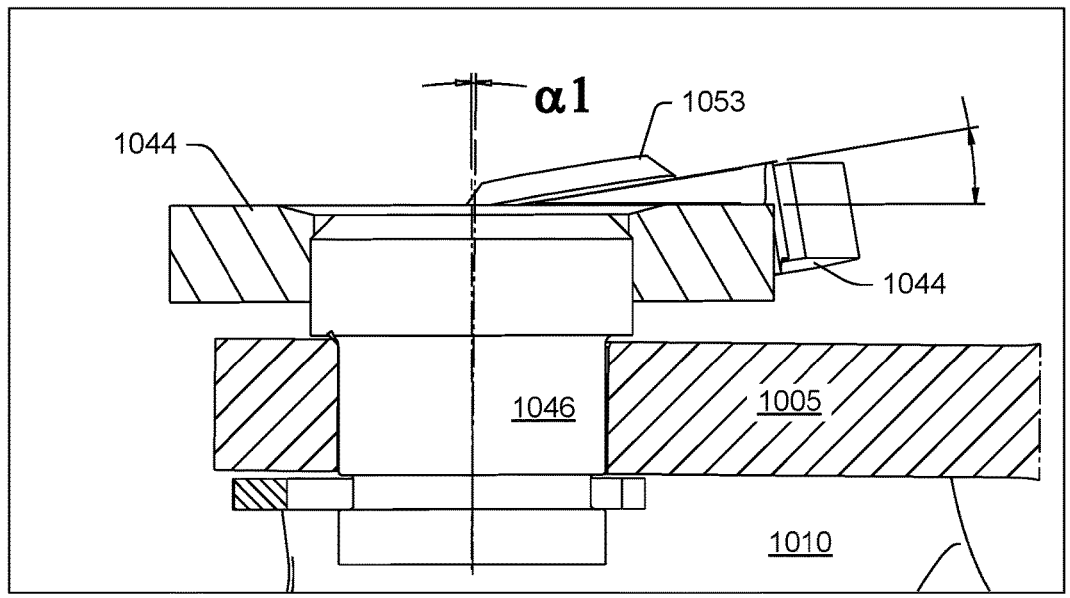
FIG. 11 is a series of views of portions of the assembly of FIG. 10.
Figure 11:
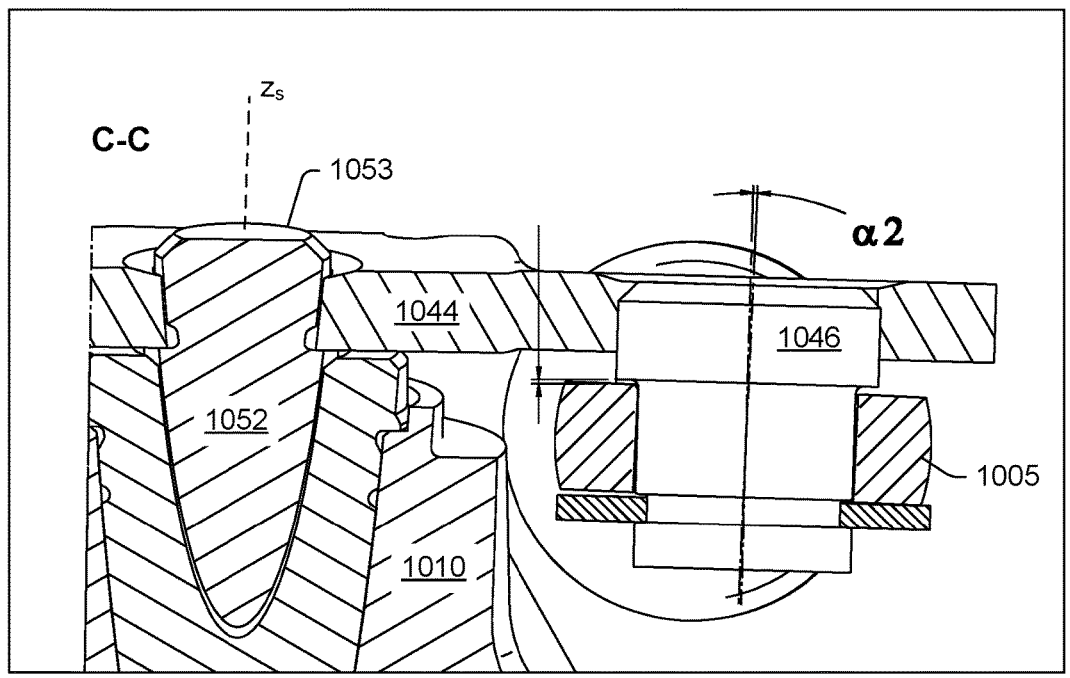

FIG. 11 shows cutaway views of portions of the assembly 1000 of FIG. 10, including a cutaway view along a line C-C. As shown in FIG. 11, a control arm 1044 may be operatively coupled to the control linkage 1003 via a peg 1046 and the peg 1046 may experience deflections such as end deflection in a direction α1 and end deflection in a direction α2. Such deflections may be due to forces. As an example, one or more biasing mechanisms may be included in the assembly 1000 that can apply force to reduce one or more deflections, increase one or more deflections, etc.

As an example, one or more biasing mechanisms may act to firm-up a shaft of a wastegate valve, especially where the valve is in an open position. In such an example, the firming-up may act to reduce rattling, noise, exhaust leakage, etc.

As an example, an assembly may include clearances between parts in kinematics where, for example, the parts are operatively coupled to an actuator, a control linkage, etc. of a turbocharger. For example, a turbocharger assembly may include an electric actuator that actuates a rigid linkage component that is operatively coupled to one or more other components. As an example, one or more clearances may be provided for purposes of accommodating one or more misalignments that may stem from manufacturing of a component or components, thermal distortion, etc. One or more clearances may allow for movement that may lead to noise, wear, etc. As an example, one or more biasing mechanisms may be included in a turbocharger assembly that act to eliminate and/or damp movement (e.g., vibration damping, etc.). As an example, one or more biasing mechanisms may provide for "zero clearance" kinematics at one or more interfaces between components.

As an example, an assembly may include a spring (e.g., a coil spring, etc.) positioned outboard of a kinematics control system. In such an example, the coil spring may reduce axial and/or radial clearances in along a kinematic chain, for example, optionally with little to no effect on actuator calibration or in a manner that may be accounted for in actuator calibration. As an example, a spring may have a relatively constant stiffness (e.g., application of force) over a stroke range of an actuator with respect to a control linkage.

As an example, the assembly 800 of FIG. 8 may include one or more features of an assembly such as the assembly 200 of FIG. 2, the assembly 300 of FIG. 3, etc. As an example, an assembly may include a biasing cam such as the biasing cam 400 and may include a biasing mechanism such as the spring 910. For example, an assembly may include multiple mechanisms that may act to exert a biasing force on a shaft of a wastegate where the biasing force may depend on rotational orientation of the shaft about an axis of the shaft where rotational orientation may determine whether a wastegate is in a closed state or an open state.

As an example, an assembly may include multiple biasing features. As an example, an assembly may include multiple springs. In such an example, a control rod or a control linkage may include features for coupling one or more springs to the control rod or the control linkage, for example, to exert a biasing force to the control rod or the control linkage that acts to move a shaft operatively coupled to a wastegate plug, optionally in a manner where the biasing force varies depending on the position of the control rod or the control linkage (e.g., consider an axial position, as controlled via an actuator). As an example, in a cylindrical coordinate system with a z-axis defined along a control axis of a control rod or a control linkage, one or more springs may be operatively coupled to the control rod or the control linkage where such one or more springs extend at an angle (e.g., or angles). In such an example, the one or more springs may act to shift the z-axis in space, for example, in a manner that acts to move a shaft (e.g., in at least an axial direction along an axis of the shaft) that is operatively coupled to the control rod or the control linkage (e.g., via a control arm, etc.). In such an example, a shift may depend on position of the control rod or the control linkage as controlled by an actuator (e.g., for opening or closing a wastegate valve).

As an example, an actuator may include a linkage operatively coupled to a control arm and a biasing mechanism that is operatively coupled to the linkage and that is operatively coupled to one or more of a compressor assembly, a center housing assembly and a turbine assembly. In such an example, the linkage may be or include a rod. As an example, a linkage may include one or more components that may be configured for movement such as movement along an axis, for example, to control a control arm operatively coupled to a wastegate plug.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate plug extending from the wastegate shaft; a control arm operatively coupled to the wastegate shaft; and a biasing cam operatively coupled to the control arm where the biasing cam includes a disengaged orientation associated with a closed position of the wastegate plug with respect to the wastegate seat and an engaged orientation associated with an open position of the wastegate plug with respect to the wastegate seat. In such an example, the disengaged orientation may include an axial clearance for axial movement of the wastegate shaft with respect to the bushing and/or the engaged orientation may include a zero axial clearance for axial movement of the wastegate shaft with respect to the bushing.

As an example, an axial clearance of a disengaged orientation may provide for self-centering of a wastegate plug with respect to a wastegate seat. As an example, a zero axial clearance may provide for reduction in noise (e.g., rattling of one or more components).

As an example, a biasing cam may include a base and at least one biasing member that extends from the base. As an example, a bushing may include at least one feature where the disengaged orientation of the biasing cam orients at least one biasing member with respect to the at least one feature.

As an example, a bushing may include a recess, a biasing cam may include a biasing member and a disengaged orientation and/or an engaged orientation may be defined with respect to the recess and the biasing member.

As an example, a wastegate shaft and a wastegate plug may be a unitary component (e.g., optionally including an arm disposed between the shaft and the plug).

As an example, a wastegate seat may include a profile defined in part by a cone. In such an example, a wastegate plug may include a profile defined at least in part by a portion of a torus for contacting the profile of the wastegate seat defined in part by the cone.

As an example, a method may include providing an assembly that includes a turbine housing that includes a bore, a wastegate seat and a wastegate passage that extends to the wastegate seat; a bushing configured for receipt by the bore; a rotatable wastegate shaft configured for receipt by the bushing; a wastegate plug extending from the wastegate shaft; a control arm operatively coupled to the wastegate shaft; and a biasing cam operatively coupled to the control arm; rotating the control arm; and, responsive to rotating the control arm, engaging the biasing cam for application of a biasing force to the wastegate shaft that reduces an axial clearance associated with the wastegate shaft. In such an example, the engaging the biasing cam may include rotating a biasing member of the biasing cam with respect to recess of the bushing.

As an example, the aforementioned method may include rotating the control arm in an opposite rotational direction and, responsive to the rotating in the opposite rotational direction, disengaging the biasing cam. In such an example, the disengaging the biasing cam may include rotating a biasing member of the biasing cam with respect to a recess of the bushing. In such an example, the method may include receiving the biasing member by the recess to provide an axial clearance between at least a portion of the biasing member and a surface of the recess.

As an example, a turbocharger may include a compressor assembly; a center housing assembly; and a turbine assembly that includes a biasing cam operatively coupled to a control arm that controls position of a wastegate plug with respect to a wastegate seat where the biasing cam includes a disengaged orientation associated with a closed position of the wastegate plug with respect to the wastegate seat and an engaged orientation associated with an open position of the wastegate plug with respect to the wastegate seat. Such a turbocharger may include, as an example, a bushing disposed in a bore of a turbine housing and a wastegate shaft disposed at least partially in the bushing where the control arm is operatively coupled to the wastegate shaft. In such an example, the bushing may include a recess and the biasing cam may include a biasing member where disengaged and engaged orientations of the biasing cam may be defined with respect to the recess and the biasing member.

As an example, a turbocharger may include an actuator that includes a linkage operatively coupled to the control arm. As an example, a turbocharger may include an actuator that includes a linkage operatively coupled to a control arm and a biasing mechanism that is operatively coupled to the linkage and that is operatively coupled to one or more of a compressor assembly, a center housing assembly and a turbine assembly of the turbocharger.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate plug extending from the wastegate shaft; a control arm operatively coupled to the wastegate shaft; a control linkage operatively coupled to the control arm where the control linkage includes a control axis; an actuator operatively coupled to the control linkage for translation of the control linkage in a direction of the control axis; and a biasing mechanism operatively coupled to the control linkage where the biasing mechanism can apply an off-axis force to the control linkage. In such an example, the biasing mechanism may be or include a spring (e.g., a coil spring, etc.).

As an example, an assembly may include a compressor housing that includes a bracket where a biasing mechanism is operatively coupled to the bracket. As an example, a control linkage may include a notch, an opening or other feature that may, for example, provide for coupling of a biasing mechanism to the control linkage. As an example, an assembly may include one or more biasing mechanisms that may apply off-axis force(s) to a control linkage. As an example, such an assembly may further include a biasing cam, for example, operatively coupled to a wastegate shaft.

As an example, in an assembly, translation of a control linkage in a direction of a control axis may position a wastegate plug in an open state with respect to a wastegate seat and translation of the control linkage in another direction of the control axis may position the wastegate plug in a closed state with respect to the wastegate seat. As an example, a control linkage may be biased to position a wastegate plug in a closed state with respect to a wastegate seat where, for example, an actuator may overcome a biasing force to position the wastegate plug in an open state with respect to the wastegate seat.

As an example, an assembly may include a center housing and/or a compressor housing. As an example, an assembly may include a bracket mounted to (e.g., directly and/or indirectly) at least one of a turbine housing, a center housing and a compressor housing where, for example, a biasing mechanism or biasing mechanisms may be operatively coupled to the bracket. As an example, an assembly may include multiple brackets, connection points, etc. for coupling of a biasing mechanism that also couples to a control linkage (e.g., or control linkages).

As an example, a control linkage may be or include a control rod. As an example, an assembly may include a peg that extends from a control arm where a control linkage is operatively coupled to the peg. In such an example, the control linkage may include a coupler (e.g., a fitting) that receives the peg (e.g., via an opening, a recess, etc.).

As an example, an actuator may be or include an electric actuator. As an example, such an actuator may include an electric motor, an inductor, etc.

As an example, a turbocharger can include a compressor assembly; a center housing assembly; a turbine assembly that includes a control arm that controls position of a wastegate plug with respect to a wastegate seat; a control linkage operatively coupled to the control arm; an actuator operatively coupled to the control linkage for translation of the control linkage along a control linkage axis; and a biasing mechanism operatively coupled to the control linkage where the biasing mechanism can apply an off-axis force to the control linkage. In such an example, the biasing mechanism may be or include a spring. As an example, a turbocharger may include a bracket mounted to at least one of a compressor assembly, a center housing assembly and a turbine assembly where a biasing mechanism is operatively coupled to the bracket. In such an example, the biasing mechanism may be or include a coil spring.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbine housing that comprises a wastegate passage that extends to a wastegate seat;
   a wastegate valve that comprises a control arm coupled to a wastegate shaft that extends to a wastegate plug;
   a control linkage operatively coupled to the control arm wherein the control linkage comprises a control axis;
   an actuator operatively coupled to the control linkage for translation of the control linkage in a direction of the control axis; and
   a spring operatively coupled to the control linkage at an off-axis angle to the control axis of the control linkage wherein, in a closed state of the wastegate plug with respect to the wastegate seat, a clearance exists with respect to a surface of the wastegate shaft to center the wastegate plug with respect to the wastegate seat wherein, in the closed state, the spring exerts no load and wherein, in an open state of the wastegate plug with respect to the wastegate seat, a lesser clearance exists or a contact exists with respect to the surface of the wastegate shaft wherein, in the open state, the spring exerts a load.

2. The assembly of claim 1 wherein the spring comprises a coil spring.

3. The assembly of claim 1 wherein the control linkage comprises a notch and wherein the spring couples to the control linkage at the notch.

4. The assembly of claim 1 comprising another spring operatively coupled to the control linkage.

5. The assembly of claim 1 comprising a biasing cam operatively coupled to the wastegate shaft.

6. The assembly of claim 1 wherein translation of the control linkage in a direction of the control axis positions the wastegate plug in the open state with respect to the wastegate seat.

7. The assembly of claim 1 wherein translation of the control linkage in a direction of the control axis positions the wastegate plug in the closed state with respect to the wastegate seat.

8. The assembly of claim 1 wherein the control linkage comprises a control rod.

9. The assembly of claim 1 wherein the actuator comprises an electric actuator.

10. The assembly of claim 1 wherein reduction of the clearance reduces noise.

11. The assembly of claim 1 wherein reduction of the clearance reduces leakage of exhaust gas.

12. The assembly of claim 1 wherein the clearance comprises a clearance defined with respect to a surface of a bushing and the surface of the wastegate shaft wherein the bushing is disposed at least in part in a bore of the turbine housing and wherein the wastegate shaft is disposed at least in part in the bore of the turbine housing.

13. The assembly of claim 1 wherein the turbine housing comprises a bore wherein the wastegate shaft is disposed at least in part in the bore.

14. The assembly of claim 13 comprising a bushing wherein the bushing is disposed at least in part in the bore between the bore and the wastegate shaft.

15. The assembly of claim 1 comprising a peg that extends from the control arm wherein the control linkage is operatively coupled to the peg.

16. The assembly of claim 15 wherein the control linkage comprises a coupler that receives the peg.

17. The assembly of claim 1 comprising a center housing assembly operatively coupled to the turbine housing.

18. The assembly of claim 17 comprising a compressor assembly operatively coupled to the center housing assembly.

19. The assembly of claim 18 comprising a bracket mounted to at least one of the compressor assembly, the center housing assembly and the turbine assembly wherein the spring is operatively coupled to the bracket.

20. An assembly comprising:
- a turbine housing that comprises a wastegate passage that extends to a wastegate seat;
- a wastegate valve that comprises a control arm coupled to a wastegate shaft that extends to a wastegate plug;
- a control linkage operatively coupled to the control arm wherein the control linkage comprises a control axis;
- an actuator operatively coupled to the control linkage for translation of the control linkage in a direction of the control axis; and
- a spring operatively coupled to the control linkage at an off-axis angle to the control axis of the control linkage wherein, in a closed state of the wastegate plug with respect to the wastegate seat, a clearance exists with respect to a surface of the wastegate shaft to center the wastegate plug with respect to the wastegate seat wherein, in the closed state, the spring exerts a first load and wherein, in an open state of the wastegate plug with respect to the wastegate seat, a lesser clearance exists or contact exists with respect to the surface of the wastegate shaft wherein, in the open state, the spring exerts a second load that is greater than the first load.

* * * * *